United States Patent
Xu et al.

(10) Patent No.: US 11,640,683 B2
(45) Date of Patent: May 2, 2023

(54) STROKE SPECIAL EFFECT PROGRAM FILE PACKAGE GENERATING METHOD AND APPARATUS, AND STROKE SPECIAL EFFECT GENERATING METHOD AND APPARATUS

(71) Applicant: BEIJING SENSETIME TECHNOLOGY DEVELOPMENT CO., LTD., Beijing (CN)

(72) Inventors: Qinqin Xu, Beijing (CN); Zhanpeng Li, Beijing (CN)

(73) Assignee: BEIJING SENSETIME TECHNOLOGY DEVELOPMENT CO., LTD., Beijing (CN)

(*) Notice: Subject to any disclaimer, the term of this patent is extended or adjusted under 35 U.S.C. 154(b) by 9 days.

(21) Appl. No.: 16/917,986

(22) Filed: Jul. 1, 2020

(65) Prior Publication Data

US 2020/0334875 A1    Oct. 22, 2020

Related U.S. Application Data

(63) Continuation of application No. PCT/CN2019/074501, filed on Feb. 1, 2019.

(30) Foreign Application Priority Data

Feb. 6, 2018    (CN) .......................... 201810118942.8

(51) Int. Cl.
*G06T 11/20*    (2006.01)
*G06T 7/12*    (2017.01)
(Continued)

(52) U.S. Cl.
CPC .............. *G06T 11/203* (2013.01); *G06T 7/12* (2017.01); *G06T 11/001* (2013.01); *G06T 11/60* (2013.01);
(Continued)

(58) Field of Classification Search
CPC ....... G06T 7/12; G06T 11/001; G06T 11/203; G06T 11/60; G06T 2207/30201;
(Continued)

(56) References Cited

U.S. PATENT DOCUMENTS

2003/0164847 A1*   9/2003   Zaima ..................... G06T 13/00
                                                                                                                   715/723
2013/0271485 A1    10/2013   Aoki
(Continued)

FOREIGN PATENT DOCUMENTS

CN          1707682 A      12/2005
CN      101329402 A      12/2008
(Continued)

OTHER PUBLICATIONS

Third Office Action of the Chinese application No. 201810118942.8, dated Apr. 14, 2021, 10 pgs.
(Continued)

*Primary Examiner* — Jacinta M Crawford
*Assistant Examiner* — Andrew Shin
(74) *Attorney, Agent, or Firm* — Cooper Legal Group, LLC

(57) ABSTRACT

Stroke special effect program file package generating methods and apparatuses, and stroke special effect generating methods and apparatuses are provided. The stroke special effect program file package generating method includes: obtaining a parameter value of a stroke effect parameter of a target object; and generating a stroke special effect program file package according to the parameter value of the stroke effect parameter of the target object.

17 Claims, 6 Drawing Sheets

(51) Int. Cl.
  *G06T 11/00* (2006.01)
  *G06T 11/60* (2006.01)
(52) U.S. Cl.
  CPC .............. *G06T 2200/24* (2013.01); *G06T 2207/10016* (2013.01); *G06T 2207/30201* (2013.01)
(58) Field of Classification Search
  CPC ....... G06T 2200/24; G06T 2207/10016; G06F 9/451; G06K 9/00281; G06K 9/00389
  See application file for complete search history.

(56) References Cited

U.S. PATENT DOCUMENTS

| | | | |
|---|---|---|---|
| 2014/0043321 A1* | 2/2014 | Matjasko | G06T 15/00 345/419 |
| 2016/0171297 A1* | 6/2016 | Qin | G06V 30/1423 382/187 |
| 2020/0051298 A1* | 2/2020 | Nguyen | G06T 11/60 |

FOREIGN PATENT DOCUMENTS

| | | |
|---|---|---|
| CN | 101354789 A | 1/2009 |
| CN | 102087750 A | 6/2011 |
| CN | 102567031 A | 7/2012 |
| CN | 102693553 A | 9/2012 |
| CN | 104123742 A | 10/2014 |
| CN | 104572123 A | 4/2015 |
| CN | 104778712 A | 7/2015 |
| CN | 104822292 A | 8/2015 |
| CN | 108399654 A | 8/2018 |
| EP | 0811953 A2 | 12/1997 |
| JP | H0935005 A | 2/1997 |
| JP | H11312160 A | 11/1999 |
| JP | 2006260198 A | 9/2006 |
| JP | 2007087346 A | 4/2007 |
| JP | 2010211308 A | 9/2010 |
| KR | 20140127354 A | 11/2014 |
| KR | 20160052564 A | 5/2016 |
| KR | 20160060783 A | 5/2016 |

OTHER PUBLICATIONS

"State of the art of the virtual reality applied to design and manufacturing processes" Jun. 2007, Antonio Jimeno-Morenilla, The International Journal of Advanced Manufacturing Technology, 10 pgs.
Adobe Premiere Elements 9, Nov. 2010, I/O, vol. 35, No. 11, Nov. 1, 2010, The first version of the "Sumon Yoh Na Video Succession Shift Premiere Elements" series, 3 pgs.
First Office Action of the Japanese application No. 2020-535033, dated Jun. 17, 2021, 31 pgs.
"By AE in Stroke effects, and layer masking capabilities to create dynamic flow diagram"; Jun. 2016; Li Yingqing, Liu Jingfang and Sun Dan; Journal of Liaoning Normal University (Natural Science Edition), vol. 39, No. 2, 30, 9 pgs.
International Search Report in the international application No. PCT/CN2019/074501, dated May 7, 2019, 2 pgs.
English translation of the Written Opinion of the International Search Authority in the international application No. PCT/CN2019/074501, dated May 7, 2019, 6 pgs.
First Office Action of the Chinese application No. 201810118942.8, dated Mar. 2, 2020, 33 pgs.
Notice of Allowance of the Korean application No. 10-2020-7018869, dated Mar. 31, 2022, 4 pgs.

* cited by examiner

STROKE SPECIAL EFFECT PROGRAM FILE PACKAGE GENERATING METHOD AND APPARATUS, AND STROKE SPECIAL EFFECT GENERATING METHOD AND APPARATUS

CROSS-REFERENCE TO RELATED APPLICATIONS

The present disclosure is a U.S. continuation application of International Application No. PCT/CN2019/074501, filed on Feb. 1, 2019, which claims priority to Chinese Patent Application No. 201810118942.8, filed with the Chinese Patent Office on Feb. 6, 2018, and entitled "STROKE SPECIAL EFFECT PROGRAM FILE PACKAGE GENERATING METHOD AND APPARATUS, AND STROKE SPECIAL EFFECT GENERATING METHOD AND APPARATUS". The content of International Application No. PCT/CN2019/074501 and Chinese Patent Application No. 201810118942.8 are incorporated herein by reference in their entireties.

BACKGROUND

Augmented reality (AR) is a new technology which "seamlessly" integrates real world information and virtual world information, where entity information in a certain time and space range originally in the real world is simulated and then virtual information is superimposed thereto, the virtual information is applied to the real world, and characters and environments in the real world and virtual objects are superimposed to and coexist in the same image or space in real time, so that a sensory experience beyond reality is achieved.

SUMMARY

The present disclosure relates to computer vision technologies, and in particular, to a stroke special effect program file package generating method and apparatus, and a stroke special effect generating method and apparatus.

Embodiments of the present disclosure provide technical solutions for stroke special effect generation.

A stroke special effect program file package generating method provided according to one aspect of the embodiments of the present disclosure includes:

obtaining a parameter value of a stroke effect parameter of a target object; and generating a stroke special effect program file package according to the parameter value of the stroke effect parameter of the target object.

A stroke special effect generating method provided according to another aspect of the embodiments of the present disclosure includes:

obtaining a parameter value of a stroke effect parameter of a target object; and generating a stroke special effect of the target object on a to-be-processed image based on the target object in the to-be-processed image and the parameter value of the stroke effect parameter of the target object.

A stroke special effect program file package generating apparatus provided according to another aspect of the embodiments of the present disclosure includes:

a first obtaining module, configured to obtain a parameter value of a stroke effect parameter of a target object; and a first generating module, configured to generate a stroke special effect program file package according to the parameter value of the stroke effect parameter of the target object.

An electronic device provided according to yet another aspect of the embodiments of the present disclosure includes:

a memory, configured to store a computer program; and a processor, configured to execute the computer program stored in the memory, where when the computer program is executed, the method according to any one of the embodiments of the present disclosure is achieved.

A compute readable storage medium provided according to a yet another aspect of the embodiments of the present disclosure, where a computer program is stored thereon, and when the computer program is executed by a processor, the method according to any one of the embodiments of the present disclosure is implemented.

A computer program provided according to yet another aspect of the embodiments of the present disclosure includes computer instructions, where when the computer instructions are operated in a processor of a device, the method according to any one of the embodiments of the present disclosure is implemented.

Based on the stroke special effect program file package generating method and apparatus, the electronic device, the program, and the medium provided by the embodiments of the present disclosure, a parameter value of a stroke effect parameter of a target object is obtained, and a stroke special effect program file package is generated according to the parameter value of the stroke effect parameter of the target object, so that a stroke effect is added to the target object in the image based on the stroke special effect program file package, and a stroke special effect of the target object in the image is implemented. In the embodiments of the present disclosure, a stroke special effect program file executable by a rendering engine is generated without using a manual writing program file, the operation is simple, the required time is short, the entire efficiency of stroke special effect implementation is improved, errors which may appear due to the manual writing program file are avoided, and the accuracy of the stroke special effect is effectively guaranteed.

Based on the stroke special effect generating method and apparatus, the electronic device, the program, and the medium provided by the embodiments of the present disclosure, a parameter value of a stroke effect parameter of a target object is obtained; and a stroke special effect of the target object is generated on an image based on the target object in the to-be-processed image and the parameter value of the stroke effect parameter of the target object, so that the stroke special effect of the target object in the image is implemented, playback of the stroke special effect of the image is implemented, and an image playback effect is improved.

The technical solutions of the present disclosure are further described in detail with reference to the accompanying drawings and embodiments as follows.

BRIEF DESCRIPTION OF DRAWINGS

The accompanying drawings constituting a part of the specification describe the embodiments of the present disclosure and are intended to explain the principles of the present disclosure together with the descriptions.

According to the following detailed descriptions, the present disclosure may be understood more clearly with reference to the accompanying drawings.

DETAILED DESCRIPTION

Figure 1:
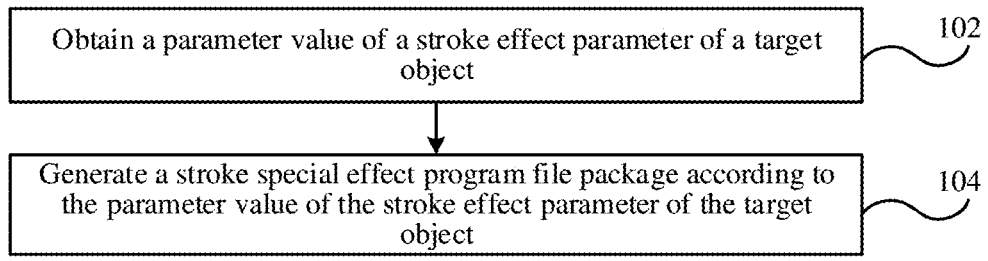
FIG. 1 is a flowchart of embodiments of a stroke special effect program file package generating method of the present disclosure.

Various exemplary embodiments of the present disclosure are now described in detail with reference to the accompanying drawings. It may be noted that, unless otherwise stated specifically, relative arrangement of the components and steps, the numerical expressions, and the values set forth in the embodiments are not intended to limit the scope of the present disclosure.

It may be further understood that in the embodiments of the present disclosure, "a plurality of" may refer to two or more, and "at least one" may refer to one, two, or more.

A person skilled in the art may understand that the terms such as "first" and "second" in the embodiments of the present disclosure are only used to distinguish different steps, devices or modules, etc., and do not represent any specific technical meaning or an inevitable logical sequence therebetween.

It may be further understood that any component, data, or structure mentioned in the embodiments of the present disclosure may be generally understood as one or more under the condition that no explicit definition is provided or no opposite motivation is provided in the context.

It should also be understood that, the descriptions of the embodiments in the present disclosure focus on differences between the embodiments, and for same or similar parts in the embodiments, refer to these embodiments. For the purpose of brevity, details are not described again.

In addition, it may be understood that, for ease of description, the size of each part shown in the accompanying drawings is not drawn in actual proportion.

The following descriptions of at least one exemplary embodiment are merely illustrative actually, and are not intended to limit the present disclosure and applications or uses thereof.

Technologies, methods and devices known to a person of ordinary skill in the related art may not be discussed in detail, but such technologies, methods and devices may be considered as a part of the specification in appropriate situations.

It may be noted that similar reference numerals and letters in the following accompanying drawings represent similar items. Therefore, once an item is defined in an accompanying drawing, the item does not need to be further discussed in the subsequent accompanying drawings.

In addition, the term "and/or" in the present disclosure only describes an association relation between associated objects, indicating that three relations may exist, for example, A and/or B may indicate three conditions, i.e., A exists separately, A and B exist at the same time, and B exists separately. In addition, the character "/" in the present disclosure generally represents the preceding and latter associated objects are in an "or" relation.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the systems, and the like.

The electronic devices such as terminal devices, computer systems, and servers may be described in the general context of computer system executable instructions (such as, program modules) executed by the computer systems. Generally, the program modules may include routines, programs, target programs, components, logics, data structures, and the like for performing specific tasks or implementing specific abstract data types. The computer systems/servers may be practiced in the distributed cloud computing environments in which tasks are performed by remote processing devices that are linked through a communications network. In the distributed computing environments, the program modules may be located in local or remote computing system storage mediums including storage devices.

FIG. 1 is a flowchart of an embodiment of a stroke special effect program file package generating method of the present disclosure. A stroke special effect program file package generating method according to embodiments of the present disclosure, for example, is implemented by, but not limited to, one apparatus (referred to as a stroke special effect program file package generating apparatus in the embodiments of the present disclosure). As shown in FIG. 1, the stroke special effect program file package generating method according to the embodiments includes:

At 102, a parameter value of a stroke effect parameter of a target object is obtained.

In the embodiments of the present disclosure, a target object, for example, may include, but is not limited to, at least one of the following: at least part of a character, an object, an imported sub-material, or the like. In some embodiments, the character may refer to person.

In an optional example, the operation 102 may be performed by a processor by invoking a corresponding instruction stored in a memory, and may also be performed by a first obtaining module run by the processor.

At 104, a stroke special effect program file package is generated according to the parameter value of the stroke effect parameter of the target object.

In an optional example, the operation 102 may be performed by a processor by invoking a corresponding instruction stored in a memory, and may also be performed by a first obtaining module run by the processor.

In the embodiments of the present disclosure, there may be one or more target objects. If there is a plurality of target objects, parameters values of stroke effect parameters of the plurality of target objects are obtained, and a stroke special effect program file package is generated based on the parameters values of the stroke effect parameters of the plurality of target objects.

The stroke effect or stroke special effect in the embodiments of the present disclosure is also called as contour rendering, which relates to performing rendering of the contour of the target object by using a certain color and/or lines of a certain thickness.

In the embodiments of the present disclosure, the stroke special effect program file package is configured to perform stroke special effect processing on the target object in the image and add a stroke to the target object in the image to implement the stroke special effect, for example, performing AR effect rendering processing on the target object in the video image. The embodiments of the present disclosure are applicable to images, videos, games, and the like, for example, to highlight a certain object in a game, a stroke effect is added to a certain target object in the game based on the embodiments of the present disclosure.

Based on the stroke special effect program file package generating method provided by the embodiments of the present disclosure, a parameter value of a stroke effect parameter of a target object is obtained, and a stroke special effect program file package is generated according to the parameter value of the stroke effect parameter of the target object, so that a stroke effect is added to the target object in the image based on the stroke special effect program file package, and a stroke special effect of the target object in the image is implemented. In the embodiments of the present disclosure, a stroke special effect program file executable by a rendering engine is generated without using a manual writing program file, the operation is simple, the required time is short, the entire efficiency of stroke special effect implementation is improved, errors which may appear due to the manual writing program file are avoided, and the accuracy of the stroke special effect is effectively guaranteed.

In another embodiment of the stroke special effect program file package generating method of the present disclosure, the method further includes: receiving a target object selection instruction input through an interactive interface of an action bar, selecting the target object, generating a stroke effect parameter setting interface of the target object, and displaying the stroke effect parameter setting interface of the target object under the action bar. Accordingly, in the embodiment, the operation 102 may be performed by using the following mode: receiving the parameter value of the stroke effect parameter sent through the interactive interface in the stroke effect parameter setting interface of the target object.

In one optional example, the operation 102 may be performed by using the following mode: in response to receiving the parameter value of the stroke effect parameter sent through the interactive interface in the stroke effect parameter setting interface of the target object, using a received parameter value as the parameter value of the stroke effect parameter of the target object; and/or in response to not receiving the parameter value of the stroke effect parameter sent through the interactive interface in the stroke effect parameter setting interface of the target object, using a preset parameter value as the parameter value of the stroke effect parameter of the target object.

Furthermore, in another embodiment of the stroke special effect program file package generating method of the present disclosure, the method further includes: receiving a cancellation instruction, input through the interactive interface of the action bar, for cancelling the stroke effect of the target object, and deleting the stroke effect parameter of the target object.

In yet another embodiment of the stroke special effect program file package generating method of the present disclosure, the method further includes: establishing a correspondence between a to-be-stroked area of the target object and the parameter value of the stroke effect parameter of the target object. Accordingly, the operation 104 includes: generating the stroke special effect program file package according to the correspondence between the to-be-stroked area of the target object and the parameter value of the stroke effect parameter of the target object, and the parameter value of the stroke effect parameter of the target object. That is, the stroke special effect program file package in the present embodiment further includes: the correspondence between the to-be-stroked area of the target object and the parameter value of the stroke effect parameter of the target object.

Exemplarily, the to-be-stroked area of the target object, for example, includes, but is not limited to: at least part of an object segmentation boundary area of an image where the target object is located, or a fitted line of at least two key points of the target object.

The key points of the target object are pre-defined. In one implementation mode of the embodiments of the present disclosure, the key point includes at least one of the following: a head key point, a face key point, a shoulder key point, an arm key point, a gesture key point, a waist key point, a leg key point, a foot key point, a human skeleton key point, or the like.

In one optional example, the head key point, for example, includes, but is not limited to, at least one of the following: a head top key point, a nose tip key point, a chin key point, or the like.

In one optional example, the face key point, for example, includes, but is not limited to, at least one of the following: a face contour key point, an eye key point, an eyebrow key point, a nose key point, a mouth key point, or the like.

Exemplarily, the eye key point, for example, includes, but is not limited to, at least one of the following: a left eye contour key point, a left eye pupil center key point, a left eye center key point, a right eye contour key point, a right eye pupil center key point, a right eye center key point, or the like. The eyebrow key point, for example, includes, but is not limited to, at least one of the following: a left eyebrow key point, a right eyebrow key point, or the like. The nose key point, for example, includes, but is not limited to, at least one of the following: a nose bridge key point, a nose lower edge key point, a nose outer contour key point, or the like. The mouth key point, for example, includes, but is not limited to, at least one of the following: an upper lip key point, a lower lip key point, or the like.

In one optional example, the shoulder key point, for example, includes, but is not limited to, at least one of the following: a shoulder-head junction key point located at a junction position of the shoulder and the head, a shoulder contour midpoint key point located at a midpoint position between an arm root contour key point and the shoulder-head junction key point, or the like.

In one optional example, the arm key point, for example, includes, but is not limited to, at least one of the following: a wrist contour key point, an elbow contour key point, an arm root contour key point, a lower arm contour midpoint key point located at a midpoint position between the wrist contour key point and the elbow contour key point, an upper arm midpoint key point located at a midpoint position between the elbow contour key point or the arm root contour key point, and the like.

In one optional example, the gesture key point, for example, includes at least one of the following: four vertex key points of a gesture box (i.e., a gesture detection bounding box), a center key point of the gesture box, or the like.

In one optional example, the leg key point, for example, includes at least one of the following: a crotch key point, a knee contour key point, an ankle contour key point, a thigh root outside contour key point, a shank contour midpoint key point located at a midpoint position between the knee contour key point and the ankle contour key point, a thigh inner contour midpoint key point located at a midpoint position between the knee inner contour key point and the crotch key point, a thigh outer contour midpoint key point located at a midpoint position between the knee outer contour key point and the thigh root outside contour key point, or the like.

In one optional example, the waist key point, for example, includes at least one of the following: N−1 equal division points generated by dividing the thigh root outside contour key point or the arm root contour key point into N equal parts, where N is greater than 1.

In one optional example, the foot key point, for example, includes, but is not limited to, at least one of the following: a tiptoe key point, a heel key point, or the like.

In one optional example, the human skeleton key point, for example, includes, but is not limited to, at least one of the following: a right shoulder skeleton key point, a right elbow skeleton key point, a right wrist skeleton key point, a left shoulder skeleton key point, a left elbow skeleton key point, a left wrist skeleton key point, a right hip skeleton key point, a right knee skeleton key point, a right ankle skeleton key point, a left hip skeleton key point, a left knee skeleton key point, a left ankle skeleton key point, a head top skeleton key point, a neck skeleton key point, or the like.

In the embodiments of the present disclosure, the to-be-stroked area of the target object is pre-configured as: the fitted line of at least two key points of the target object. For example, in one implementation mode, if the target object is a face, a plurality of key points are defined for the face, so that in generation of the background special effect, the to-be-stroked area of the face is determined based on the fitted line of the face key points. In addition, in one implementation mode, if the target object is a gesture (hand), a plurality of key points are defined for the gesture (hand), so that in generation of the background special effect, the to-be-stroked area of the hand is determined based on the fitted line of the gesture (hand) key points. In addition, in one implementation mode, if the target object is a head, a plurality of key points are defined for the head, so that in generation of the background special effect, the to-be-stroked area of the head is determined based on the fitted line of the head key points.

Figure 2:
FIG. 2 is an exemplary schematic diagram of face key points in the embodiments of the present disclosure.

For example, FIG. 2 is an exemplary schematic diagram of face key points in the embodiments of the present disclosure. In combination with FIG. 2, in one optional example, the face key points are defined as follows:

| Key point item | Key point number |
| --- | --- |
| Face outline (face contour key point) | 0-32 |
| Left eyebrow | 33-37, 64-67 |
| Left eye contour | 52-57, 72-73 |
| Left eye pupil | 74, 104, |
| Nose lower edge | 47-51 |
| Upper lip | 84-90, 96-100 |
| Nose bridge | 43-46 |
| Right eyebrow | 38-42, 68-71 |
| Right eye contour | 58-63, 75-76 |
| Right eye pupil | 77, 105 |
| Nose outer contour | 78-83 |
| Lower lip | 91-95, 101-103 |

In one optional example, the hand key points are defined as follows:

| Key point item | Key point number |
| --- | --- |
| Gesture box | 110-113 |
| center | 114 | where the key points with numbers 110-113 are respectively four vertex key points of a gesture detection bounding box (i.e., an external box of the hand), and the key point with number 114 is the center of the gesture detection bounding box.

In one implementation mode of the method embodiments of the present disclosure, the stroke effect parameter includes at least one of the following:

1. a display parameter (Display) configured to control whether to display a stroke effect, where the parameter value includes two options, i.e., "Yes" and "No", if the parameter value is selected as "Yes", it indicates that a deformation area is required to be displayed in a video playback process, and if the parameter value is selected as "No", it indicates that the deformation area is not required to be displayed in the video playback process;

2. a width parameter (Width) configured to represent a width of a stroke, where the parameter value includes: ultrathin, thin, medium, thick, ultrathick, and the like, for a user to select;

3. a color parameter (Color) configured to represent a color of the stroke, for example, a color block display picker is configured for a user to select, and white is displayed by default;

4. a trigger event parameter (TriggerType) configured to represent a trigger event triggering display of the stroke effect, which indicates triggering display of the stroke special effect by what event, where the parameter value includes various trigger events, and a user is able to select at least one event from a preset event set as a trigger event; that is, in the video playback or image playback process, if a particular trigger event is detected, the display of the stroke special effect of the target object is triggered, for example, if a trigger event "open the mouth" specified in a trigger time parameter appears in a video, the stroke special effect of the mouth is displayed;

5. a trigger delay parameter (TriggerDelay) configured to represent time for delayed display of the stroke effect, that is, how may frames are delayed to start displaying the stroke special effect of the target object when a trigger event in the trigger event parameter is detected at a certain frame of a video, and the time for delayed display of the stroke special effect of the target object is configured or selected as the parameter value;

6. a display frame number parameter (DisplayFrames) configured to represent the number of frames of display of the stroke effect, where the number of frames is selected by a user, and exemplarily, the number of frames may be configured and selected as 0, indicating that the stroke effect is kept being displayed;

7. a trigger stop parameter (TriggerStop) configured to represent a trigger event stopping display of the stroke effect, which indicates stopping the display of the stroke special effect of the target object by what event, where the parameter value includes various trigger events, and a user is able to select at least one event from a preset event set as a trigger action for stopping the stroke special effect of the target object; in one optional example, the trigger event, for example, includes, but is not limited to, at least one of the following: a trigger without an event, an eye action, a head action, an eyebrow action, a hand action, a mouth action, a shoulder action, a deformation special effect, a sticker special effect, and a sound special effect; or 8. a beautifying/make-up (beautifying and/or make-up) effect parameter, used for representing a beautifying/make-up effect displayed at a preset position of the target object (or other objects) when the stroke effect of the target object is displayed, for example, red lips, colored contact lenses, blue eyes, and the like. For example, when the stroke effect of the head is displayed, red lips are displayed at the mouth.

In one optional example, the trigger event, for example, includes, but is not limited to, at least one of the following: a trigger without an event, an eye action, a head action, an eyebrow action, a hand action, a mouth action, a shoulder action, a deformation special effect, a sticker special effect, or a sound special effect:

a trigger without an action (NULL), i.e., the sub-material is displayed without any action;

an eye action, for example, blinking, closing the eyes, and opening the eyes;

a head action, for example, shaking the head, nodding, tilting the head, turning the head, and the like;

an eyebrow action, for example, raising the eyebrow;

a hand action, for example, loving-heart gesture, palm-up, palm, thumb-up, congratulations with hands folded, finger heart with one hand, OK gesture, peace gesture, pistol gesture, and an index finger;

a mouth action, for example, opening the mouth and closing the mouth;

a shoulder action, for example, shrugging the shoulders;

a deformation special effect, for example, face deformation;

a sticker special effect, for example, a rainbow special effect at the mouth, and an earring special effect at the ear;

a sound special effect, for example, a certain voice change special effect; and other actions.

Figure 3:
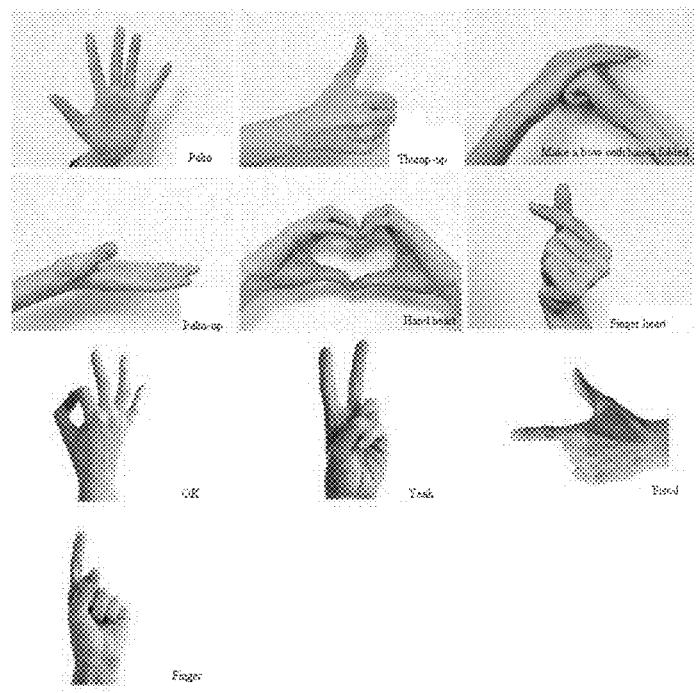
FIG. 3 is an exemplary schematic diagram of hand actions in the embodiments of the present disclosure.

FIG. 3 is an exemplary schematic diagram of hand actions in the embodiments of the present disclosure.

In yet another embodiment of the stroke special effect program file package generating method of the present disclosure, the method further includes: displaying a reference image of the target object through a content display bar.

In one implementation mode, when the target object is a character, the reference image of at least part of the character, for example, includes, but is not limited to, at least one of the following of the character: a complete image, a head image, a face image, a shoulder image, an arm image, a gesture image, a waist image, a leg image, a foot image, or the like.

In addition, optionally, in yet another embodiment of the stroke special effect program file package generating method of the present disclosure, the method further includes: displaying the stroke effect of the target object on the content display bar according to the parameter value of the stroke effect parameter of the target object.

In yet another embodiment of the stroke special effect program file package generating method of the present disclosure, the method further includes: a stroke special effect program file package generating apparatus is started according to a received start instruction and displays an operation interface, the operation interface includes: the action bar, the content display bar, and a program file bar.

Figure 4:
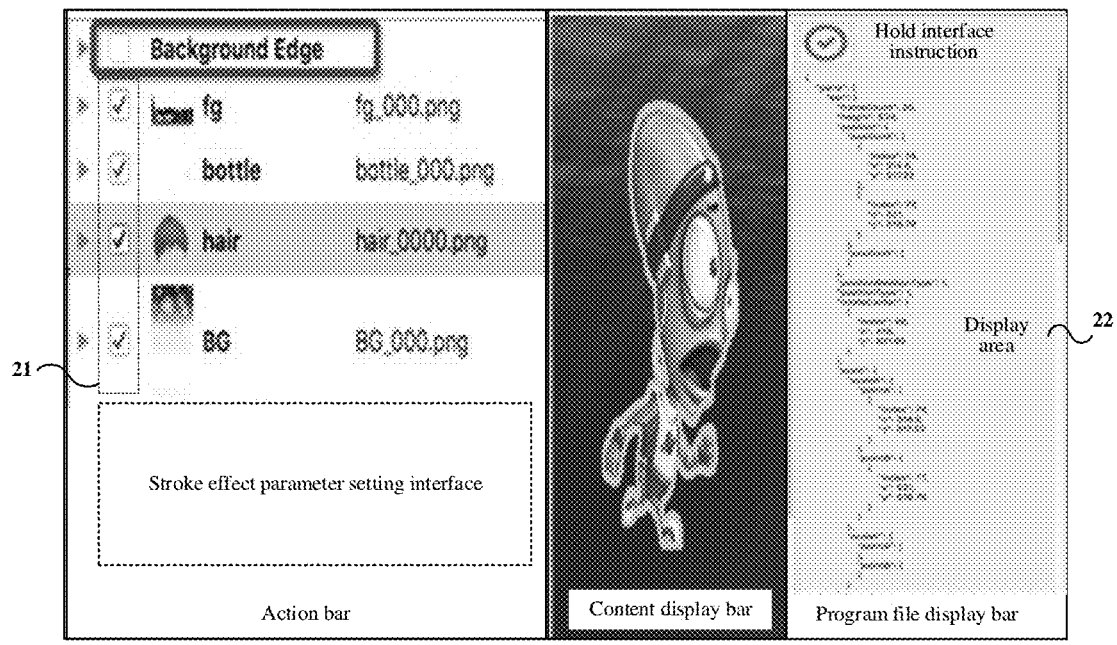
FIG. 4 is an exemplary schematic diagram of an operation interface of a stroke special effect program file package generating apparatus in the embodiments of the present disclosure.

As shown in FIG. 4, in one optional example, the operation interface includes a left area, a middle area, and a right area. Accordingly, the operation interface includes: displaying the action bar at the left side of the operation interface, displaying the content display bar in the middle of the operation interface, and displaying the program file bar at the right side of the operation interface.

The action bar at the left side shows stroke special effect (BackgroundEdge) content examples. A target object selection instruction is received through an interactive interface 21 in the action bar at the left side, and a parameter value of the stroke effect parameter is received through another interactive interface (not shown) under the target object. The content display bar displays the stroke effect of the target object according to the parameter value of the stroke effect parameter of the target object. A program file display bar at the right side is configured to displays, through a display area 22 therein, content for implementing the stroke special effect program file of the target object, and export the stroke special effect program file package through a save instruction interface 23 in the program file display bar, i.e., generating and saving the stroke special effect program file package. As an optional example of the embodiments of the present disclosure instead of limitation, the action bar includes a stroke effect parameter setting interface.

In one implementation mode of the embodiments of the present disclosure, the stroke special effect program file package generating apparatus further include a pre-configured stroke special effect program file, which may be, for example, a JavaScript language-based lightweight file of a data interchange format (JavaScript Object Notiation, json), or any other executable program files. The parameter value of the stroke effect parameter in the stroke special effect program file may be idle or preset as a default value, and when a parameter value configured for the stroke effect parameter is received, the corresponding parameter value in the stroke special effect program file is automatically updated as the received parameter value. Optionally, the stroke special effect program file package generating apparatus includes an action bar, which is provided with at least one interactive interfaces configured to receive a parameter value configured for the stroke effect of the target object. In addition, stroke special effect program file package generating apparatus further includes a program file display bar configured to display the program file of the stroke effect of the target object as shown in FIG. 4, which is an exemplary diagram of an operation interface of the stroke special effect program file package generating apparatus in the embodiments of the present disclosure, and the operation interaction of the stroke special effect program file package generating apparatus includes the action bar and the program file display bar. After the stroke special effect program file package generating apparatus is started, corresponding to the stroke effect parameter setting interface of the target object in the action bar, the program file display bar displays the stroke special effect program file in the case that the stroke effect parameter of the target object is idle or preset as the default value, and when the parameter value configured for the stroke effect parameter of the target object is received through the interactive interface of the action bar, the parameter value of the stroke effect parameter of the target object is updated as the newly received parameter value, and the program file display bar displays the stroke special effect program file after the update of the parameter value in real time.

In the embodiments of the present disclosure, a file executable by a rendering engine is generated without using a manual writing program file, the stroke special effect program package is implemented based on a configuration operation by a user on the parameter value of the stroke effect parameter of the target object in the action bar, the operation is simple, the required time is short, the entire efficiency of stroke special effect implementation is improved, errors which may appear due to the manual writing program file are avoided, and the accuracy of the stroke special effect is effectively guaranteed.

Figure 5:
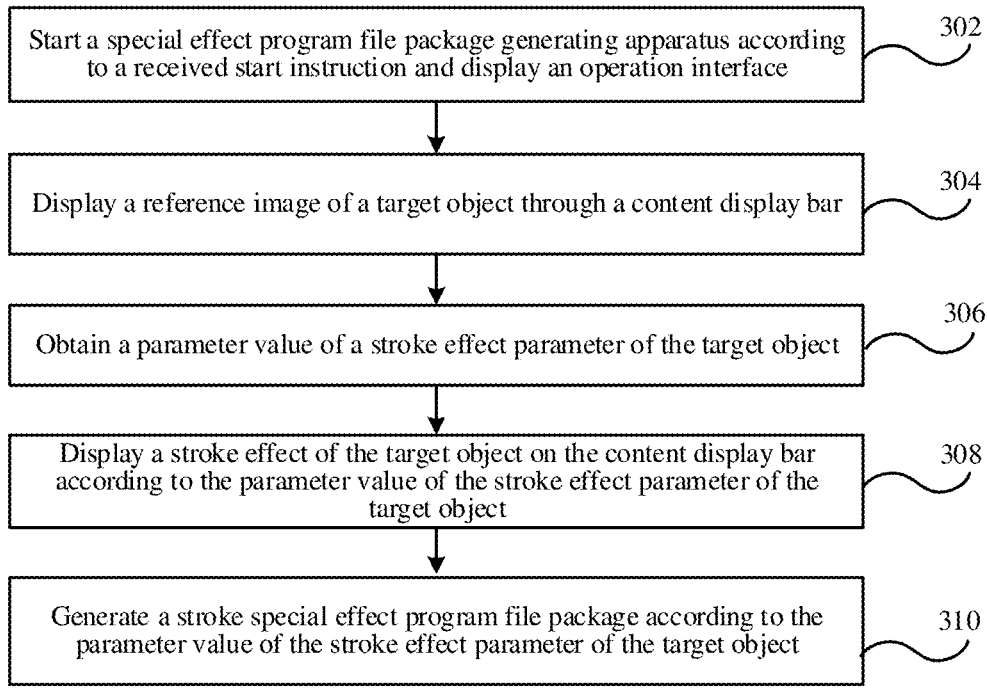
FIG. 5 is a flowchart of embodiments of a stroke special effect program file package generating method of the present disclosure.

FIG. 5 is a flowchart of another embodiment of a stroke special effect program file package generating method of the present disclosure. As shown in FIG. 5, the stroke special effect program file package generating method according to the embodiments includes:

At 302, the stroke special effect program file package generating apparatus is started according to a received start instruction and displays the operation interface, where the operation interface includes: the action bar, the content display bar, and the program file bar.

At 304, a reference image of the target object is displayed through a content display bar.

In an optional example, operation 304 may be executed by the processor by invoking a corresponding instruction stored in the memory, and may also be executed by the operation interface run by the processor or the content display bar in the operation interface.

At 306, a parameter value of a stroke effect parameter of a target object is obtained.

In the embodiments of the present disclosure, a target object, for example, may include, but is not limited to, at least one of the following: at least part of a character, an object, an imported sub-material, or the like.

In an optional example, the operation 306 may be performed by a processor by invoking a corresponding instruction stored in a memory, and may also be performed by a first obtaining module run by the processor.

At 308, the stroke effect of the target object is displayed on the content display bar according to the parameter value of the stroke effect parameter of the target object.

In an optional example, operation 308 may be executed by the processor by invoking a corresponding instruction stored in the memory, and may also be executed by the operation interface run by the processor or the content display bar in the operation interface.

At 310, a stroke special effect program file package is generated according to the parameter value of the stroke effect parameter of the target object.

In an optional example, the operation 308 may be performed by a processor by invoking a corresponding instruction stored in a memory, and may also be performed by a first generating module run by the processor.

Optionally, in embodiments of the stroke special effect program file package generating method of the present disclosure, the method further includes: displaying a key point of the target object on the content display bar.

In addition, in yet another embodiment of the stroke special effect program file package generating method of the present disclosure, the method further includes: after generating the stroke special effect program file package, saving the stroke special effect program file package, according to a received save instruction, at a position pointed by the save instruction.

In one implementation mode, saving the stroke special effect program file package, according to the received save instruction, at the position pointed by the save instruction includes:

displaying a save path selection interface and a compression interface in response to receiving the save instruction;

receiving a save path sent through the save path selection interface; receiving a compression mode sent through the compression interface, and compressing the stroke special effect program file package according to the compression mode to generate a compressed file package; and saving the compressed file package to a folder pointed by the save path.

When the size of the stroke special effect program file package is relatively large, and the program file package is not suitable for running in a mobile phone terminal, in the embodiments of the present disclosure, the stroke special effect program file package is compressed and saved, so that the program file package may be imported to the mobile phone terminal to generate the stroke special effect.

After the stroke special effect program file package is generated based on the embodiments of the present disclosure, the stroke special effect program file package is imported to the terminal to generate the stroke special effect for the target object in the image played on the terminal.

Figure 6:
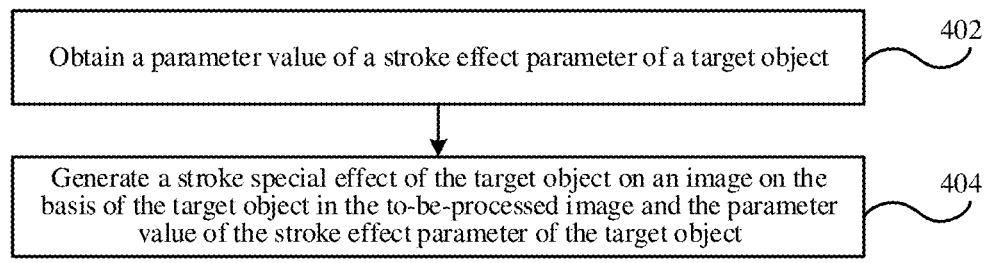
FIG. 6 is a flowchart of embodiments of a stroke special effect generating method of the present disclosure.

FIG. 6 is a flowchart of an embodiment of a stroke special effect generating method of the present disclosure. A stroke special effect generating method according to embodiments of the present disclosure, for example, is implemented by, but not limited to, one apparatus (referred to as a stroke special effect generating apparatus in the embodiments of the present disclosure). The stroke special effect generating apparatus may be, for example, an AR engine, an electronic having an AR drawing function (e.g., an electronic device having an AR engine), or the like. As shown in FIG. 6, the stroke special effect generating method according to the embodiments includes:

At 402, a parameter value of a stroke effect parameter of a target object is obtained.

In an optional example, operation 402 may be performed by a processor by invoking a corresponding instruction stored in a memory, and may also be performed by a second obtaining module run by the processor.

At 404, a stroke special effect of the target object is generated on a to-be-processed image based on the target object in the to-be-processed image and the parameter value of the stroke effect parameter of the target object.

In an optional example, the operation 404 may be performed by a processor by invoking a corresponding instruction stored in a memory, and may also be performed by a second generating module run by the processor.

Based on the stroke special effect generating method provided by the embodiments of the present disclosure, a parameter value of a stroke effect parameter of a target object is obtained; and a stroke special effect of the target object is generated on a to-be-processed image based on the target object in the to-be-processed image and the parameter value of the stroke effect parameter of the target object, so that the stroke special effect of the target object in the image is implemented, playback of the stroke special effect of the image is implemented, and an image playback effect is improved.

In another embodiment of the stroke special effect generating method of the present disclosure, before the operation 402, the method further includes: importing a stroke special effect program file package. In one implementation mode, the operation of importing the stroke special effect program file package includes: reading the stroke special effect program file package into a memory by invoking an interface function for reading a file package; and parsing the stroke special effect program file package to obtain the stroke special effect program file, the stroke special effect program file including the parameter value of the stroke effect parameter of the target object. In one optional example, the stroke special effect program file, for example, includes, but is not limited to: a stroke special effect program file generated by a j son program or other executable programs. Accordingly, in the embodiment, the operation 402 includes: obtaining the parameter value of the stroke effect parameter of the target object in the stroke special effect program file package.

Exemplarily, the stroke special effect program file package is, but not limited to, generated by using any one of the embodiments of the stroke special effect program file package generating method of the present disclosure.

In the embodiments of the stroke special effect generating method of the present disclosure, the stroke special effect program file package may include a parameter value of a stroke effect parameter of at least one target object. In addition, the stroke special effect program file package further selectively includes: the correspondence between the to-be-stroked area of the target object and the parameter value of the stroke effect parameter of the target object.

In one implementation mode, the operation 402 includes: creating a sticker handle by means of an interface function for creating a sticker handle; and reading the parameter value of the stroke effect parameter of the target object in the stroke special effect program file and saving same into the sticker handle.

Optionally, if the to-be-processed image is an image in a video, the implementation mode further includes: according to the parameter value of the stroke effect parameter of the target object in the stroke special effect program file in the sticker handle, obtaining the number of video frames displayed in the video by the stroke special effect of the target object, and reading video images corresponding to the number of video frames from the video in advance.

Another implementation mode further includes: in response to the complete of the playback of the stroke special effect program file package, destroying the sticker handle by invoking an interface function for destroying a sticker handle.

In another embodiment of the stroke special effect generating method of the present disclosure, the method further includes: determining a to-be-stroked area of the target object. Accordingly, in the embodiment, the operation 404 further includes: generating the stroke special effect in the to-be-stroked area based on a correspondence between the parameter value of the stroke effect parameter of the target object in the stroke special effect program file package and the to-be-stroked area of the target object.

In one implementation mode, determining the to-be-stroked area of the target object includes: obtaining an object segmentation result between the target object in the to-be-processed image and a part of the to-be-processed image other than the target object; and determining at least part of a segmentation boundary area as the to-be-stroked area of the target object based on the object segmentation result.

In another implementation mode, determining the to-be-stroked area of the target object includes: obtaining a key point detection result of the target object in the to-be-processed image; and determining a fitted line of at least two key points of the target object as the to-be-stroked area of the target object based on the key point detection result.

In one optional example, obtaining the key point detection result of the target object in the to-be-processed image is implemented by the following mode: performing key point detection of the target object on the to-be-processed image by a neural network, and outputting the key point detection result.

The key point detection result, for example, includes, but is not limited to, at least one of the following: a position of the key point in the image; or a preset number of the key point.

In the embodiments of the stroke special effect generating method of the present disclosure, the to-be-processed image, for example, includes, but is not limited to, at least one of the following: a still image, an image in a video, or the like.

In one implementation mode of the embodiments of the stroke special effect generating method of the present disclosure, the stroke effect parameter includes: a trigger event parameter, used for representing a trigger event triggering display of the stroke effect. Accordingly, in the embodiments, the method further includes: detecting whether the trigger event corresponding to the parameter value of the trigger event parameter appears in the image. The operation 404 includes: in response to detecting that the trigger event corresponding to the parameter value of the trigger event parameter appears in the to-be-processed image, generating the stroke special effect of the target object on the to-be-processed image based on the target object in the to-be-processed image and the parameter value of the stroke effect parameter of the target object.

In another implementation mode of the embodiments of the stroke special effect generating method of the present disclosure, the stroke effect parameter includes: a trigger stop parameter, used for representing a trigger event stopping display of the stroke effect. Accordingly, in the embodiments, the method further includes: detecting whether a trigger event corresponding to the parameter value of the end trigger parameter appears in the to-be-processed image; and in response to detecting that the trigger event corresponding to the parameter value of the end trigger parameter appears in the to-be-processed image, canceling the stroke special effect of the target object generated on the to-be-processed image.

In another implementation mode of the embodiments of the stroke special effect generating method of the present disclosure, the stroke effect parameter includes: a beautifying/make-up (beautifying and/or make-up) effect parameter, used for representing a beautifying/make-up (beautifying and/or make-up) effect displayed at a preset position of the target object when the stroke effect is displayed. Accordingly, in the embodiments, the method further includes: based on the target object in the to-be-processed image and the parameter value of the stroke effect parameter of the target object, when the stroke special effect of the target object is generated on the to-be-processed image, displaying the beautifying/make-up effect on the to-be-processed image according to the beautifying/make-up effect parameter.

Figure 7:
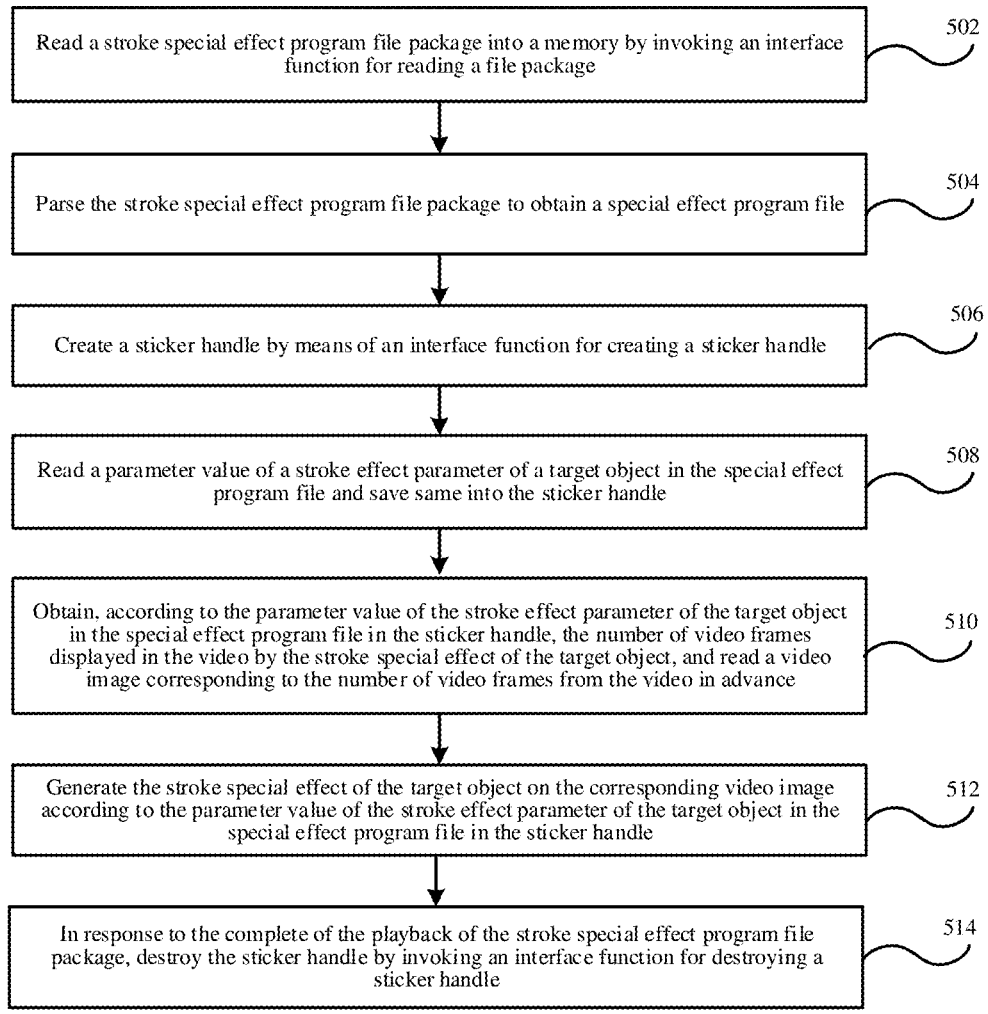
FIG. 7 is a flowchart of embodiments of a stroke special effect generating method of the present disclosure.

FIG. 7 is a flowchart of another embodiment of a stroke special effect generating method of the present disclosure. As shown in FIG. 7, the stroke special effect generating method according to the embodiments includes:

At 502, the stroke special effect program file package is read into a memory by invoking an interface function for reading a file package.

At 504, the stroke special effect program file package is parsed to obtain the stroke special effect program file, the stroke special effect program file including the parameter value of the stroke effect parameter of the target object.

In one optional example, the stroke special effect program file, for example, includes, but is not limited to: a stroke special effect program file generated by a json program or other executable programs.

In an optional example, the operations 502 to 504 may be executed by the processor by invoking a corresponding instruction stored in the memory, and may also be executed by an importing module run by the processor.

At 506, a sticker handle is created by means of an interface function for creating a sticker handle.

At 508, the parameter value of the stroke effect parameter of the target object is read in the stroke special effect program file and saved into the sticker handle.

In an optional example, operations 506 to 508 may be performed by a processor by invoking a corresponding instruction stored in a memory, and may also be performed by a second obtaining module run by the processor.

At 510, according to the parameter value of the stroke effect parameter of the target object in the stroke special effect program file in the sticker handle, the number of video frames displayed in the video is obtained by the stroke special effect of the target object, and video images corresponding to the number of video frames is read from the video in advance.

In an optional example, the operation 510 may be performed by a processor by invoking a corresponding instruction stored in a memory, and may also be performed by a third obtaining module run by the processor.

At 512, the stroke special effect of the target object is generated on the corresponding video image according to the parameter value of the stroke effect parameter of the target object in the stroke special effect program file in the sticker handle.

At 514, in response to the complete of the playback of the stroke special effect program file package, the sticker handle is destroyed by invoking an interface function for destroying a sticker handle.

In an optional example, the operations 512 to 514 may be performed by a processor by invoking a corresponding instruction stored in a memory, and may also be performed by a second generating module run by the processor.

The embodiments of the stroke special effect generating method in the present disclosure are applicable to various still images or video playback scenarios, for example, a video live broadcast scenario including a character, and a stroke special effect is generated for a target object in the live broadcast video, where the target object, for example, may be: ear, hand, face, hair, neck, shoulder, and the like.

Any stroke special effect program file package generating method or stroke special effect generating method provided by the embodiments of the present disclosure is executed by any appropriate device having data processing capability, including, but not limited to, a terminal device and a server. Alternatively, any stroke special effect program file package generating method or stroke special effect generating method provided by the embodiments of the present disclosure may executed by a processor, for example, any stroke special effect program file package generating method or stroke special effect generating method mentioned in the embodiments of the present disclosure is executed by the processor by invoking corresponding instructions stored in a memory. Details are not described below again.

A person of ordinary skill in the art may understand that all or some steps for implementing the foregoing method embodiments are achieved by a program by instructing related hardware; the foregoing program may be stored in a computer-readable storage medium; when the program is executed, steps including the foregoing method embodiments are executed. Moreover, the foregoing storage medium includes various media capable of saving program codes, such as a Read-Only Memory (ROM), a Random Access Memory (RAM), a magnetic disk, or an optical disk.

Figure 8:
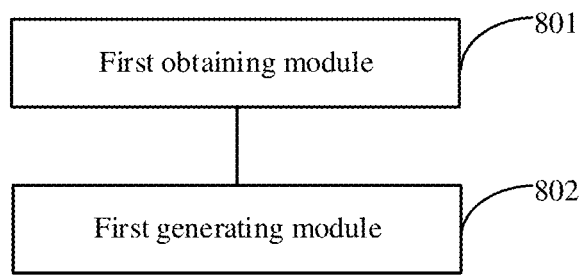
FIG. 8 is a schematic structural diagram of embodiments of a stroke special effect program file package generating apparatus of the present disclosure.

FIG. 8 is a schematic structural diagram of an embodiment of a stroke special effect program file package generating apparatus of the present disclosure. The stroke special effect program file package generating apparatus according to the embodiments of the present disclosure is configured to implement any stroke special effect program file package generating method of the present disclosure above. As shown in FIG. 8, the stroke special effect program file package generating apparatus provided according to the embodiments includes: a first obtaining module 801 and a first generating module 802.

The first obtaining module 801 is configured to obtain a parameter value of a stroke effect parameter of a target object. In the embodiments of the present disclosure, a target object, for example, may include, but is not limited to, at least one of the following: at least part of a character, an object, an imported sub-material, or the like.

The generating module 802 is configured to generate a stroke special effect program file package according to the parameter value of the stroke effect parameter of the target object.

Based on the stroke special effect program file package generating apparatus provided by the embodiments of the present disclosure, a parameter value of a stroke effect parameter of a target object is obtained, and a stroke special effect program file package is generated according to the parameter value of the stroke effect parameter of the target object, so that a stroke effect is added to the target object in the image based on the stroke special effect program file package, and a stroke special effect of the target object in the image is implemented. In the embodiments of the present disclosure, a stroke special effect program file executable by a rendering engine is generated without using a manual writing program file, the operation is simple, the required time is short, the entire efficiency of stroke special effect implementation is improved, errors which may appear due to the manual writing program file are avoided, and the accuracy of the stroke special effect is effectively guaranteed.

Figure 9:
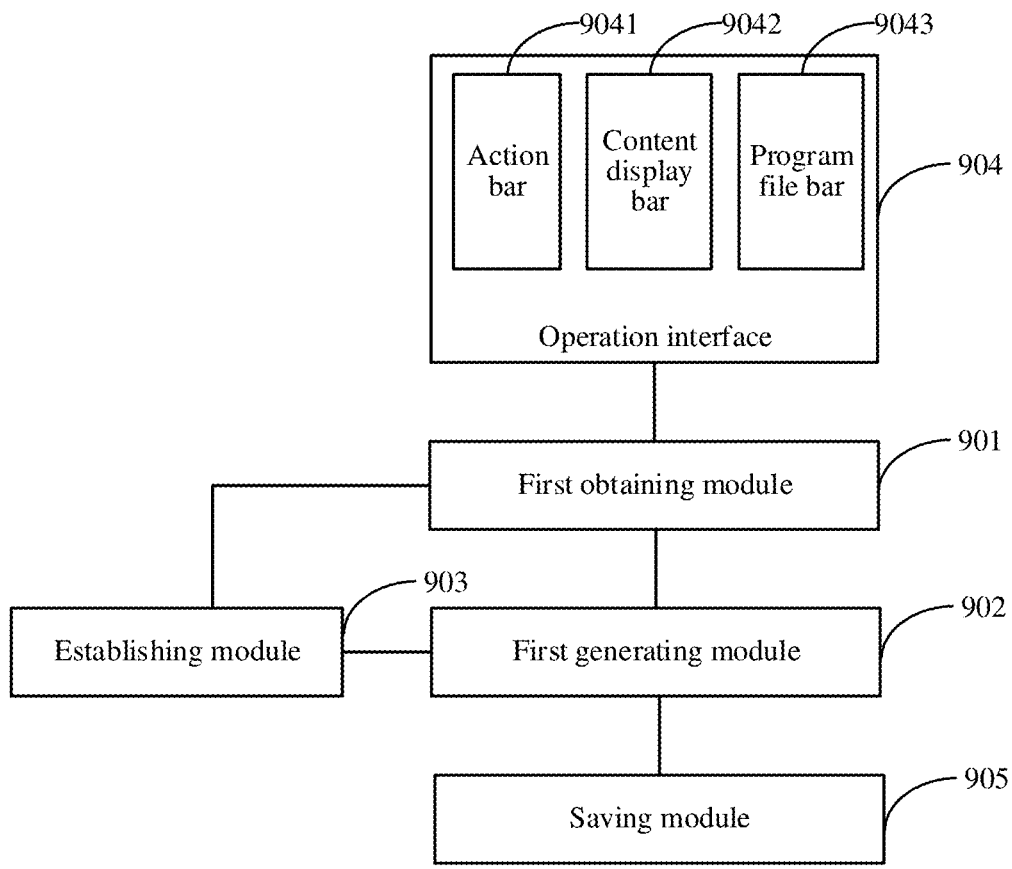
FIG. 9 is a schematic structural diagram of embodiments of a stroke special effect program file package generating apparatus of the present disclosure.

FIG. 9 is a schematic structural diagram of another embodiment of a stroke special effect program file package generating apparatus of the present disclosure. As shown in FIG. 9, compared with the embodiment shown in FIG. 8, the stroke special effect program file package generating apparatus provided according to the embodiments further includes: an establishing module 903, configured to establish a correspondence between a to-be-stroked area of the target object and the parameter value. Accordingly, in the embodiments, the first generating module 902 is configured to: generate the stroke special effect program file package according to the correspondence and the parameter value.

In one implementation mode, the to-be-stroked area of the target object, for example, includes, but is not limited to: at least part of an object segmentation boundary area of an image where the target object is located, or a fitted line of at least two key points of the target object.

In addition, with reference to FIG. 9 and FIG. 4 again, the stroke special effect program file package generating apparatus provided according to the embodiments of the present disclosure further includes: an action bar 9041, including an interactive interface, configured to receive a target object selection instruction input through the interactive interface, select the target object, generate a stroke effect parameter setting interface of the target object, and display the stroke effect parameter setting interface of the target object under the action bar. Accordingly, in the embodiments, the first obtaining module 901 is configured to receive the parameter value of the stroke effect parameter sent through the interactive interface in the stroke effect parameter setting interface of the target object.

In one implementation mode of the embodiments of the stroke special effect program file package generating apparatus of the present disclosure, the first obtaining module is configured to: in response to receiving the parameter value of the stroke effect parameter sent through the interactive interface in the stroke effect parameter setting interface of the target object, use a received parameter value as the parameter value of the stroke effect parameter of the target object; and/or in response to not receiving the parameter value of the stroke effect parameter sent through the interactive interface in the stroke effect parameter setting interface of the target object, use a preset parameter value as the parameter value of the stroke effect parameter of the target object.

In another implementation mode of the embodiments of the stroke special effect program file package generating apparatus of the present disclosure, the first obtaining module 901 is configured to: receive a cancellation instruction, input through the interactive interface of the action bar, for cancelling the stroke effect of the target object, and delete the stroke effect parameter of the target object.

In addition, with reference to FIG. 4 again, the action bar further includes: a content display bar, configured to display a reference image of the target object.

In one optional example, when the target object is a character, the reference image of at least part of the character, for example, includes, but is not limited to, at least one of the following of the character: a complete image, a head image, a face image, a shoulder image, an arm image, a gesture image, a waist image, a leg image, or a foot image.

In another implementation mode, the content display bar is further configured to display the stroke effect of the target object according to the parameter value of the stroke effect parameter of the target object.

In another implementation mode, the content display bar is further configured to display a key point of the target object.

In addition, with reference to FIG. 9 and FIG. 4 again, another embodiment of the stroke special effect program file package according to the embodiments of the present disclosure further includes: an operation interface 904, which includes the action bar 9041, a content display bar 9042, and/or a program file bar 9043.

In one optional example, the operation interface 904 includes a left area, a middle area, and a right area; and the left side of the operation interface 904 is the action bar 9041, the middle of the operation interface 904 is the content display bar 9042, and the right side of the operation interface 904 is the program file bar 9043.

In addition, with reference to FIG. 9 again, in yet another embodiment of the stroke special effect program file package generating apparatus according to the embodiments of the present disclosure, the apparatus further includes: a saving module 905, configured to save the stroke special effect program file package, according to a received save instruction, at a position pointed by the save instruction.

In one implementation mode, the saving module 905 is further configured to: display a save path selection interface and a compression interface in response to receiving the save instruction; receive a save path sent through the save path selection interface; receive a compression mode sent through the compression interface, and compress the stroke special effect program file package according to the compression mode to generate a compressed file package; and save the compressed file package to a folder pointed by the save path.

Figure 10:
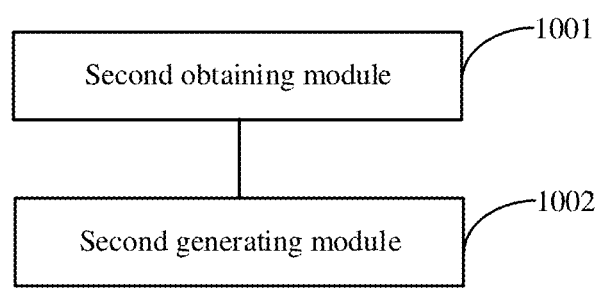
FIG. 10 is a schematic structural diagram of embodiments of a stroke special effect generating apparatus of the present disclosure.

FIG. 10 is a schematic structural diagram of an embodiment of a stroke special effect generating apparatus of the present disclosure. The stroke special effect generating apparatus according to the embodiments of the present disclosure is configured to implement any stroke special effect generating method of the present disclosure above. As shown in FIG. 10, the stroke special effect generating apparatus provided according to the embodiments includes: a second obtaining module 1001 and a second generating module 1002.

The second obtaining module 1001 is configured to obtain a parameter value of a stroke effect parameter of a target object.

The second generating module 1002 is configured to generate a stroke special effect of the target object on a to-be-processed image based on the target object in the to-be-processed image and the parameter value of the stroke effect parameter of the target object.

The to-be-processed image, for example, may include, but is not limited to, at least one of the following: a still image or an image in a video.

Based on the stroke special effect generating apparatus provided by the embodiments of the present disclosure, a parameter value of a stroke effect parameter of a target object is obtained; and a stroke special effect of the target object is generated on a to-be-processed image based on the target object in the to-be-processed image and the parameter value of the stroke effect parameter of the target object, so that the stroke special effect of the target object in the image is implemented, playback of the stroke special effect of the image is implemented, and an image playback effect is improved.

Figure 11:
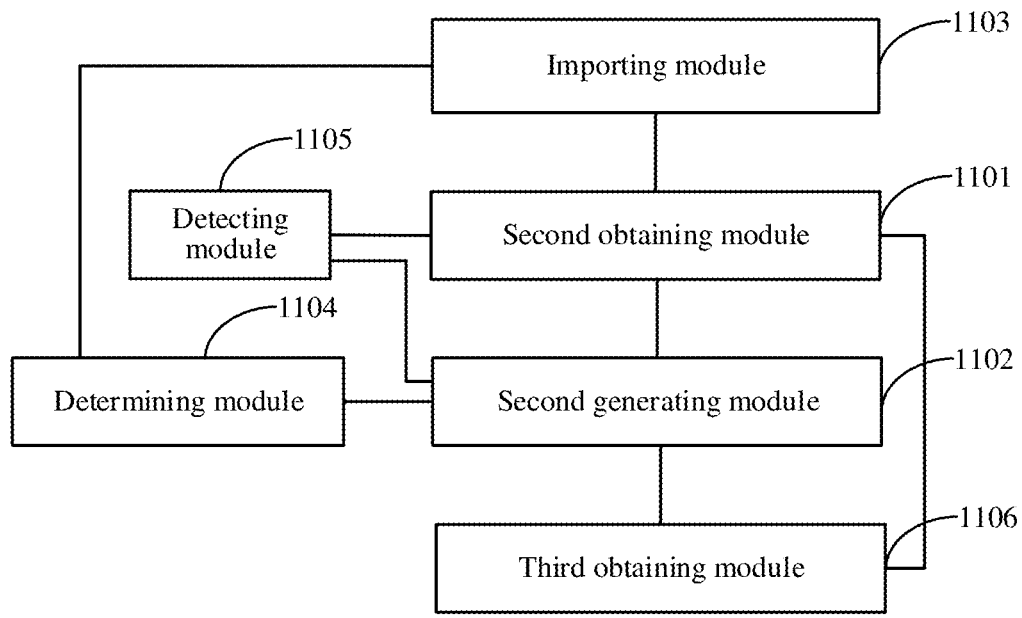
FIG. 11 is a schematic structural diagram of embodiments of a stroke special effect generating apparatus of the present disclosure.

FIG. 11 is a schematic structural diagram of another embodiment of a stroke special effect generating apparatus of the present disclosure. As shown in FIG. 11, compared with the embodiment shown in FIG. 10, the stroke special effect generating apparatus according to the embodiment further includes: an importing module 1103, configured to import a stroke special effect program file package. Accordingly, in the embodiment, the second obtaining module is configured to obtain the parameter value of the stroke effect parameter of the target object in the stroke special effect program file package.

Exemplarily, the stroke special effect program file package in the embodiments is, but not limited to, generated by using the stroke special effect program file package generating method or apparatus according to any embodiment of the present disclosure.

In addition, with reference to FIG. 11 again, in another embodiment of the stroke special effect generating apparatus of the present disclosure, the apparatus further includes: a determining module 1104, configured to determine a to-be-stroked area of the target object. Accordingly, in the embodiment, the second generating module 1102 is configured to generate the stroke special effect in the to-be-stroked area based on a correspondence between the parameter value of the stroke effect parameter of the target object in the stroke special effect program file package and the to-be-stroked area of the target object.

In one implementation mode, the determining module 1104 is configured to: obtain an object segmentation result between the target object in the to-be-processed image and a part of the to-be-processed image other than the target object; and determine at least part of a segmentation boundary area as the to-be-stroked area of the target object based on the object segmentation result.

In another implementation mode, the determining module 1104 is configured to: obtain a key point detection result of the target object in the to-be-processed image; and determine a fitted line of at least two key points of the target object as the to-be-stroked area of the target object based on the key point detection result.

In one optional example, when obtaining the key point detection result of the target object in the to-be-processed image, the determining module is configured to: perform key point detection of the target object on the to-be-processed image by a neural network, and output the key point detection result.

The key point detection result, for example, includes, but is not limited to, at least one of the following: a position of the key point in the image; or a preset number of the key point.

In one implementation mode of the embodiments of the stroke special effect generating apparatus of the present disclosure, the stroke effect parameter includes: a trigger event parameter, used for representing a trigger event triggering display of the stroke effect. Accordingly, with reference to FIG. 11 again, the stroke special effect generating apparatus according to the embodiments further includes: a detecting module 1105, configured to detect whether the trigger event corresponding to the parameter value of the trigger event parameter appears in the to-be-processed image. The second generating module 1102 is configured to: in response to detecting that the trigger event corresponding to the parameter value of the trigger event parameter appears in the to-be-processed image, generate the stroke special effect of the target object on the to-be-processed image based on the target object in the to-be-processed image and the parameter value of the stroke effect parameter of the target object.

In another implementation mode of the embodiments of the stroke special effect generating apparatus of the present disclosure, the stroke effect parameter includes: a trigger stop parameter, used for representing a trigger event stopping display of the stroke effect. Accordingly, with reference to FIG. 11 again, the stroke special effect generating apparatus according to the embodiments further includes: a detecting module 1105, configured to detect whether the trigger event corresponding to the parameter value of the trigger stop parameter appears in the to-be-processed image.

The second generating module 1102 is further configured to: in response to the detecting module detecting that the trigger event corresponding to the parameter value of the end trigger parameter appears in the to-be-processed image, cancel the stroke special effect of the target object generated on the to-be-processed image.

In another implementation mode of the embodiments of the stroke special effect generating apparatus of the present disclosure, the stroke effect parameter includes: a beautifying/make-up effect parameter, used for representing a beautifying/make-up effect displayed at a preset position of the target object when the stroke effect is displayed. Accordingly, in the stroke special effect generating apparatus according to the embodiments, the second generating module 1102 is further configured to: based on the target object in the to-be-processed image and the parameter value of the stroke effect parameter of the target object, when the stroke special effect of the target object is generated on the to-be-processed image, display the beautifying/make-up effect on the to-be-processed image according to the beautifying/make-up effect parameter.

In yet another implementation mode of the embodiments of the stroke special effect generating apparatus of the present disclosure, the importing module 1103 is configured to: read the stroke special effect program file package into a memory by invoking an interface function for reading a package; and parse the stroke special effect program file package to obtain the stroke special effect program file, the stroke special effect program file including the parameter value of the stroke effect parameter of the target object.

In still another implementation mode of the embodiments of the stroke special effect generating apparatus of the present disclosure, the second obtaining module 1101 is further configured to: create a sticker handle by means of an interface function for creating a sticker handle; and read the parameter value of the stroke effect parameter of the target object in the stroke special effect program file and save same into the sticker handle.

In addition, with reference to FIG. 11 again, if the to-be-processed image is an image in a video, the stroke special effect generating apparatus provided according to the embodiments further includes: a third obtaining module 1106, configured to obtain, according to the parameter value of the stroke effect parameter of the target object in the stroke special effect program file in the sticker handle, the number of video frames displayed in the video by the stroke special effect of the target object, and read video images corresponding to the number of video frames from the video in advance.

Optionally, in the stroke special effect generating apparatus provided according to the embodiments, the second obtaining module 1101 is further configured to: in response to the complete of the playback of the stroke special effect program file package, destroy the sticker handle by invoking an interface function for destroying a sticker handle.

In addition, another electronic device provided according to the embodiments of the present disclosure includes:

a memory, configured to store a computer program; and
a processor, configured to execute the computer program stored in the memory, where when the computer program is executed, the stroke special effect program file package generating method or the stroke special effect generating method according to any one of the embodiments of the present disclosure is implement.

Figure 12:
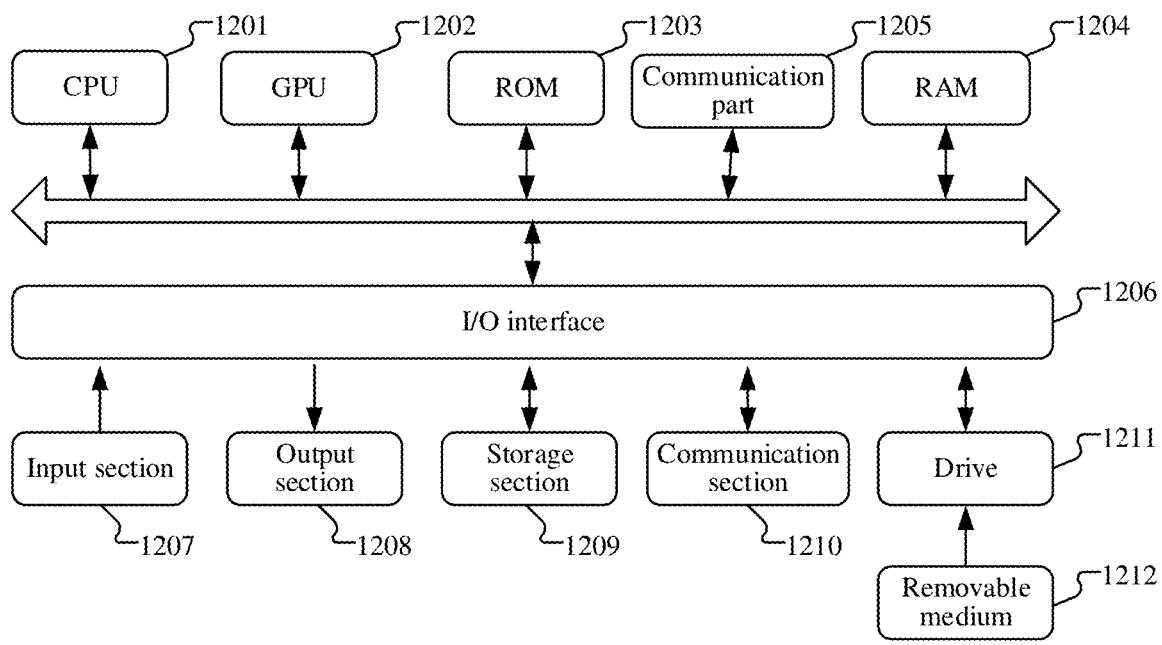
FIG. 12 is a schematic structural diagram of application embodiments of an electronic device of the present disclosure.

FIG. 12 is a schematic structural diagram of an application embodiment of an electronic device of the present disclosure.

With reference to FIG. 12 below, a schematic structural diagram of an electronic device suitable for implementing a terminal device or a server according to the embodiments of the present disclosure is shown.

As shown in FIG. 12, the electronic device includes one or more processors, a communication part, and the like. The one or more processors are, for example, one or more Central Processing Units (CPUs) 1201, and/or one or more Graphic Processing Units (GPUs) 1202, and the like. The processor may perform various appropriate actions and processing according to executable instructions stored in a Read-Only Memory (ROM) 1203 or executable instructions loaded from a storage section to a Random Access Memory (RAM) 1204. The communication part 1205 may include, but is not limited to, a network card. The network card may include, but is not limited to, an Infiniband (IB) network card. The processor may communicate with the ROM 1203 and/or the RAM 1204, to execute executable instructions. The processor is connected to the communication part 1205 via a bus, and communicates with other target devices via the communication part, thereby implementing corresponding operations of any method provided in the embodiments of the present disclosure, for example, obtaining a parameter value of a stroke effect parameter of a target object; and generating a stroke special effect program file package according to the parameter value of the stroke effect parameter of the target object; or obtaining a parameter value of a stroke effect parameter of a target object; and generating a stroke special effect of the target object on a to-be-processed image based on the target object in the to-be-processed image and the parameter value of the stroke effect parameter of the target object.

In addition, the RAM may further store various programs and data required for operations of an apparatus. The CPU 1201, the ROM 1203, and the RAM 1204 are connected to each other via the bus. In the presence of the RAM 1204, the ROM 1203 is an optional module. The RAM 1204 stores executable instructions, or writes the executable instructions into the ROM 1203 during running, where the executable instructions cause the processor to execute corresponding operations of any method of the present disclosure. An input/output (I/O) interface 1206 is also connected to the bus. The communication part 1205 may be integrated, or may be configured to have a plurality of sub-modules (for example, a plurality of IB network cards) connected to the bus.

The following components are connected to the I/O interface 1206: an input section 1207 including a keyboard, a mouse and the like; an output section 1208 including a Cathode-Ray Tube (CRT), a Liquid Crystal Display (LCD), a speaker and the like; the storage section 1209 including a hard disk and the like; and a communication section 1210 of a network interface card including an LAN card, a modem and the like. The communication section 1210 performs communication processing via a network such as the Internet. A drive 1211 is also connected to the I/O interface 1206 according to requirements. A removable medium 1212 such as a magnetic disk, an optical disk, a magneto-optical disk, a semiconductor memory or the like is mounted on the drive according to requirements, so that a computer program read from the removable medium may be installed on the storage section according to requirements.

It may be noted that the architecture illustrated in FIG. 12 is merely an optional implementation mode. During specific practice, the number and types of the components in FIG. 12 may be selected, decreased, increased, or replaced according to actual requirements. Different functional components may be separated or integrated or the like. For example, the GPU 1202 and the CPU 1201 may be separated, or the GPU 1202 may be integrated on the CPU 1201, and the communication part 1205 may be separated from or integrated on the CPU 1201 or the GPU 1202 or the like. These alternative implementation modes all fall within the scope of protection of the present disclosure.

Particularly, the process described above with reference to the flowchart according to the embodiments of the present disclosure may be implemented as a computer software program. For example, the embodiments of the present disclosure include a computer program product. The computer program product includes a computer program tangibly included in a machine-readable medium. The computer program includes a program code for performing a method shown in the flowchart. The program code may include instructions for performing steps of the face anti-counterfeiting detection method provided in the embodiments of the present disclosure. In such an embodiment, the computer program is downloaded and installed from the network through the communication section, and/or is installed from the removable medium. When the computer program is executed by the CPU, the functions defined in the method according to the present disclosure are executed.

In addition, the embodiment of the present disclosure also provides a computer program, including computer instructions. When the computer instructions run in a processor of a device, the stroke special effect program file package generating method or stroke special effect generating method according to any one of the foregoing embodiments of the present disclosure is implemented.

In addition, the embodiment of the present disclosure also provides a computer readable storage medium, which stores a computer program. When the computer program is executed by a processor, the stroke special effect program file package generating method or stroke special effect generating method according to any one of the foregoing embodiments of the present disclosure is implemented.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in the present disclosure may be implemented in many manners. For example, the methods and apparatuses in the present disclosure may be implemented with software, hardware, firmware, or any combination of software, hardware, and firmware. Unless otherwise specially stated, the foregoing sequences of steps of the methods are merely for description, and are not intended to limit the steps of the methods of the present disclosure. In addition, in some embodiments, the present disclosure is also implemented as programs recorded in a recording medium. The programs include machine-readable instructions for implementing the methods according to the present disclosure. Therefore, the present disclosure further covers the recording medium saving the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A stroke special effect program file package generating method, comprising:
   obtaining a parameter value of a stroke effect parameter of a target object;
   establishing a correspondence between a to-be-stroked area of the target object and the parameter value; and
   generating a stroke special effect program file package according to the correspondence and the parameter value of the stroke effect parameter of the target object;
   wherein the target object comprises at least one of the following: at least part of a character, an object, or an imported sub-material,
   wherein the to-be-stroked area of the target object comprises a fitted line of at least two key points of the target object,
   wherein the to-be-stroked area of the target object is determined by obtaining a key point detection result of the target object in a to-be-processed image and determining the fitted line of at least two key points of the target object as the to-be-stroked area of the target object based on the key point detection result,
   wherein the key point detection result comprises at least one of the following: a position of a key point in the to-be-processed image; or a preset number of the key point,
   wherein the stroke effect parameter comprises at least one of the following: a trigger event parameter, used for representing a trigger event triggering display of a stroke effect, wherein the trigger event comprises at least one of the following: a trigger without an event, an eye action, a head action, an eyebrow action, a mouth action, a shoulder action, a deformation special effect, a sticker special effect, or a sound special effect;
   a trigger delay parameter, used for representing time for delayed display of the stroke effect; or
   a trigger stop parameter, used for representing a trigger event stopping display of the stroke effect.

2. The method according to claim 1, further comprising: receiving a target object selection instruction input through an interactive interface of an action bar, selecting the target object, generating a stroke effect parameter setting interface of the target object, and displaying the stroke effect parameter setting interface of the target object under the action bar;
   wherein obtaining the parameter value of the stroke effect parameter of the target object comprises: receiving the parameter value of the stroke effect parameter sent through the interactive interface in the stroke effect parameter setting interface of the target object.

3. The method according to claim 2, wherein obtaining the parameter value of the stroke effect parameter of the target object comprises at least one of the following: in response to receiving the parameter value of the stroke effect parameter sent through the interactive interface in the stroke effect parameter setting interface of the target object, using the received parameter value as the parameter value of the stroke effect parameter of the target object; or in response to not receiving the parameter value of the stroke effect parameter sent through the interactive interface in the stroke effect parameter setting interface of the target object, using a preset parameter value as the parameter value of the stroke effect parameter of the target object.

4. The method according to claim 2, further comprising: receiving a cancellation instruction, input through the interactive interface of the action bar, for cancelling the stroke effect of the target object, and deleting the stroke effect parameter of the target object.

5. The method according to claim 2, further comprising: a display operation interface, which comprises at least one of the action bar, a content display bar, or a program file bar;
   wherein the operation interface comprises a left area, a middle area, and a right area; and
   the display operation interface comprises: displaying the action bar at the left area of the operation interface, displaying the content display bar in the middle area of the operation interface, and displaying the program file bar at the right area of the operation interface.

6. The method according to claim 1, further comprising: displaying a reference image of the target object through a content display bar;
   wherein when the target object is a character, the reference image of at least part of the character comprises at least one of the following of the character: a complete image, a head image, a face image, a shoulder image, an arm image, a gesture image, a waist image, a leg image, or a foot image.

7. The method according to claim 6, further comprising:
   displaying the stroke effect of the target object on the content display bar according to the parameter value of the stroke effect parameter of the target object.

8. The method according to claim 6, further comprising: displaying a key point of the target object on the content display bar;
   wherein the key point comprises at least one of the following: a head key point, a face key point, a shoulder key point, an arm key point, a gesture key point, a waist key point, a leg key point, a foot key point, or a human skeleton key point.

9. The method according to claim 1, after generating the stroke special effect program file package, further comprising: saving, according to a received save instruction, the stroke special effect program file package at a position pointed by the save instruction;
   wherein saving, according to the received save instruction, the stroke special effect program file package at the position pointed by the save instruction comprises:
   displaying a save path selection interface and a compression interface in response to receiving the save instruction;
   receiving a save path sent through the save path selection interface;
   receiving a compression mode sent through the compression interface, and compressing the stroke special effect program file package according to the compression mode to generate a compressed file package; and
   saving the compressed file package to a folder pointed by the save path.

10. A stroke special effect generating method, comprising:
    importing a stroke special effect program file package, wherein the stroke special effect program file package is generated according to a parameter value of a stroke effect parameter of a target object, wherein the target object comprises at least one of the following: at least part of a character, an object, or an imported sub-material;

obtaining the parameter value of the stroke effect parameter of the target object in the stroke special effect program file package;

determining a to-be-stroked area of the target object; and generating a stroke effect of the target object on a to-be-processed image based on the target object in the to-be-processed image and the parameter value of the stroke effect parameter of the target object, wherein generating the stroke effect of the target object on the to-be-processed image based on the target object in the to-be-processed image and the parameter value of the stroke effect parameter of the target object comprises: generating the stroke effect in the to-be-stroked area based on a correspondence between the parameter value of the stroke effect parameter of the target object in the stroke special effect program file package and the to-be-stroked area of the target object, wherein determining the to-be-stroked area of the target object comprises:

obtaining a key point detection result of the target object in the to-be-processed image; and determining a fitted line of at least two key points of the target object as the to-be-stroked area of the target object based on the key point detection result, wherein the key point detection result comprises at least one of the following: a position of a key point in the to-be-processed image; or a preset number of the key point, wherein the stroke effect parameter comprises: a trigger event parameter used for representing a trigger event triggering display of the stroke effect, wherein the method further comprises: detecting whether the trigger event corresponding to a parameter value of the trigger event parameter appears in the to-be-processed image, wherein generating the stroke effect of the target object on the to-be-processed image based on the target object in the to-be-processed image and the parameter value of the stroke effect parameter of the target object comprises: in response to detecting that the trigger event corresponding to the parameter value of the trigger event parameter appears in the to-be-processed image, generating the stroke effect of the target object on the to-be-processed image based on the target object in the to-be-processed image and the parameter value of the stroke effect parameter of the target object.

11. The method according to claim 10, wherein obtaining the key point detection result of the target object in the to-be-processed image comprises: performing, on the to-be-processed image by a neural network, key point detection for the target object, and outputting the key point detection result.

12. The method according to claim 10, wherein the stroke effect parameter comprises: a trigger stop parameter, used for representing a trigger event stopping display of the stroke effect; and the method further comprises: detecting whether a trigger event corresponding to a parameter value of the trigger stop parameter appears in the to-be-processed image; and in response to detecting that the trigger event corresponding to the parameter value of the trigger stop parameter appears in the to-be-processed image, canceling the stroke effect of the target object generated on the to-be-processed image.

13. The method according to claim 10, wherein the stroke effect parameter comprises: a beautifying/make-up effect parameter used for representing a beautifying/make-up effect displayed at a preset position when the stroke effect is displayed; and the method further comprises: based on the target object in the to-be-processed image and the parameter value of the stroke effect parameter of the target object, when the stroke effect of the target object is generated on the to-be-processed image, displaying the beautifying/make-up effect on the to-be-processed image according to the beautifying/make-up effect parameter.

14. The method according to claim 10, wherein importing the stroke special effect program file package comprises: reading the stroke special effect program file package into a memory by invoking an interface function for reading a file package; and parsing the stroke special effect program file package to obtain a stroke special effect program file, the stroke special effect program file comprising the parameter value of the stroke effect parameter of the target object.

15. The method according to claim 14, wherein obtaining the parameter value of the stroke effect parameter of the target object comprises: creating a sticker handle by means of an interface function for creating a sticker handle; and reading the parameter value of the stroke effect parameter of the target object in the stroke special effect program file and saving the parameter value of the stroke effect parameter of the target object into the sticker handle.

16. The method according to claim 15, wherein when the to-be-processed image is an image in a video, the method further comprises: according to the parameter value of the stroke effect parameter of the target object in the stroke special effect program file in the sticker handle, obtaining a number of video frames displayed by the stroke effect of the target object in the video, and reading video images corresponding to the number of video frames from the video in advance.

17. An electronic device, comprising:

a processor; and a memory configured to store instructions executable for the processor, wherein when the instructions are executed by the processor, the processor is configured to:

obtain a parameter value of a stroke effect parameter of a target object;

establish a correspondence between a to-be-stroked area of the target object and the parameter value; and generate a stroke special effect program file package according to the correspondence and the parameter value of the stroke effect parameter of the target object, wherein the target object comprises at least one of the following: at least part of a character, an object, or an imported sub-material;

wherein the to-be-stroked area of the target object comprises a fitted line of at least two key points of the target object, wherein the to-be-stroked area of the target object is determined by obtaining a key point detection result of the target object in a to-be processed image and determining the fitted line of at least two key points of the target object as the to-be-stroked area of the target object based on the key point detection result, wherein the key point detection result comprises at least one of the following: a position of a key point in the to-be-processed image; or a preset number of the key point, wherein the stroke effect parameter comprises at least one of the following:
a trigger event parameter, used for representing a trigger event triggering display of a stroke effect, wherein the trigger event comprises at least one of the following: a trigger without an event, an eye action, a head action, an eyebrow action, a hand action, a mouth action, a shoulder action, a deformation special effect, a sticker special effect, or a sound special effect;
a trigger delay parameter, used for representing time for delayed display of the stroke effect; or
a trigger stop parameter, used for representing a trigger event stopping display of the stroke effect;
or, the processor is configured to:
import a stroke special effect program file package, wherein the stroke special effect program file package is generated according to a parameter value of a stroke effect parameter of a target object, wherein the target object comprises at least one of the following: at least part of a character, an object, or an imported sub-material;
obtain the parameter value of the stroke effect parameter of the target object in the stroke special effect program file package;
determine a to-be-stroked area of the target object; and
generate a stroke effect of the target object on a to-be-processed image based on the target object in the to-be-processed image and the parameter value of the stroke effect parameter of the target object,
wherein generating the stroke effect of the target object on the to-be-processed image based on the target object in the to-be-processed image and the parameter value of the stroke effect parameter of the target object comprises: generating the stroke effect in the to-be-stroked area based on a correspondence between the parameter value of the stroke effect parameter of the target object in the stroke special effect program file package and the to-be-stroked area of the target object,
wherein determining the to-be-stroked area of the target object comprises:
obtaining a key point detection result of the target object in the to-be-processed image; and
determining a fitted line of at least two key points of the target object as the to-be-stroked area of the target object based on the key point detection result,
wherein the key point detection result comprises at least one of the following: a position of a key point in the to-be-processed image; or a preset number of the key point,
wherein the stroke effect parameter comprises: a trigger event parameter used for representing a trigger event triggering display of the stroke effect, wherein the processor is further configured to: detect whether the trigger event corresponding to a parameter value of the trigger event parameter appears in the to-be-processed image,
wherein generating the stroke effect of the target object on the to-be-processed image based on the target object in the to-be-processed image and the parameter value of the stroke effect parameter of the target object comprises: in response to detecting that the trigger event corresponding to the parameter value of the trigger event parameter appears in the to-be-processed image, generating the stroke effect of the target object on the to-be-processed image based on the target object in the to-be-processed image and the parameter value of the stroke effect parameter of the target object.

* * * * *